(12) United States Patent
Murakami et al.

(10) Patent No.: US 12,176,785 B2
(45) Date of Patent: Dec. 24, 2024

(54) WATERPROOF FAN

(71) Applicant: SANYO DENKI CO., LTD., Tokyo (JP)

(72) Inventors: Naoki Murakami, Tokyo (JP); Koji Ueno, Tokyo (JP); Takashi Kawashima, Tokyo (JP); Naoya Ozumi, Tokyo (JP)

(73) Assignee: SANYO DENKI CO., LTD., Tokyo (JP)

( * ) Notice: Subject to any disclaimer, the term of this patent is extended or adjusted under 35 U.S.C. 154(b) by 259 days.

(21) Appl. No.: 17/717,801

(22) Filed: Apr. 11, 2022

(65) Prior Publication Data

US 2022/0352779 A1    Nov. 3, 2022

(30) Foreign Application Priority Data

Apr. 30, 2021 (JP) .................................. 2021-077857

(51) Int. Cl.
*H02K 5/10* (2006.01)
*F04D 25/06* (2006.01)
(Continued)

(52) U.S. Cl.
CPC ........... *H02K 5/10* (2013.01); *F04D 25/0613* (2013.01); *H02K 5/08* (2013.01); *H02K 5/225* (2013.01)

(58) Field of Classification Search
CPC .. H02K 1/14; H02K 1/16; H02K 1/32; H02K 1/33; H02K 1/187; H02K 1/20;
(Continued)

(56) References Cited

U.S. PATENT DOCUMENTS

| 4,818,907 A | 4/1989 | Shirotori |
| 6,133,666 A * | 10/2000 | Hollenbeck ............ H02K 11/33 310/67 R |

(Continued)

FOREIGN PATENT DOCUMENTS

| DE | 102018110822 A1 | 11/2019 |
| EP | 2136455 A1 | 12/2009 |

(Continued)

OTHER PUBLICATIONS

Extended European Search Report (EESR) dated Sep. 28, 2022 for European Patent Application No. 22169841.8.
(Continued)

*Primary Examiner* — Naishadh N Desai
*Assistant Examiner* — Ahmed F Seck
(74) *Attorney, Agent, or Firm* — RANKIN, HILL & CLARK LLP

(57) ABSTRACT

A waterproof fan includes: a rotating blade configured to be rotatable about a rotation axis; a rotor including a permanent magnet; a stator including a plurality of stator cores located on an inner diameter side relative to the rotating blade, the plurality of stator cores extending in a radial direction relative to the rotation axis, and windings each wound around a respective stator core; a circuit board electrically connected to the windings; a waterproof cover including a first resin, the waterproof cover covering the circuit board; and a molded portion including a second resin, the molded portion covering at least the stator, the waterproof cover includes: a partitioning portion separating the windings from the circuit board; and a protruding portion protruding from the partitioning portion into a space between the windings, and gaps between the windings, and the partitioning portion and the protruding portion are filled with the second resin.

7 Claims, 4 Drawing Sheets

(51) Int. Cl.
*H02K 5/08* (2006.01)
*H02K 5/22* (2006.01)

(58) Field of Classification Search
CPC ...... H02K 1/27; H02K 1/2786; H02K 1/2787; H02K 1/2788; H02K 1/2789; H02K 1/2791; H02K 1/28; H02K 1/34; H02K 3/18; H02K 3/20; H02K 3/12; H02K 3/32; H02K 3/34; H02K 5/02; H02K 5/04; H02K 5/10; H02K 5/08; H02K 5/18; H02K 5/161; H02K 5/24; H02K 5/26; H02K 5/203; H02K 5/207; H02K 9/02; H02K 9/04; H02K 9/06; H02K 9/08; H02K 9/12; H02K 9/14; H02K 9/19; H02K 9/20; H02K 9/193; H02K 9/197; H02K 9/225; H02K 9/227; H02K 37/06; H02K 15/10; H02K 15/12; H02K 15/16; H02K 7/14; H02K 7/085; H02K 11/00; H02K 11/0094; H02K 11/33; H02K 21/22; F04D 19/00; F04D 19/002; F04D 25/06; F04D 25/0613; F04D 25/0646; F04D 25/0686; F04D 29/023; F04D 29/053; F04D 29/32
See application file for complete search history.

(56) References Cited

U.S. PATENT DOCUMENTS

| | | | |
|---|---|---|---|
| 6,271,609 B1 * | 8/2001 | Hollenbeck | H02K 1/187 310/71 |
| 10,164,498 B2 * | 12/2018 | Otsuka | H02K 5/02 310/88 |
| 11,923,747 B2 | 3/2024 | Schmezer | |
| 2003/0173851 A1 * | 9/2003 | Kudou | H02K 5/08 310/156.12 |
| 2008/0063542 A1 * | 3/2008 | Oguma | F04D 29/263 415/214.1 |
| 2012/0049777 A1 * | 3/2012 | Kern | H02P 6/16 318/400.35 |
| 2013/0039783 A1 * | 2/2013 | Wagner | F04D 29/059 417/313 |
| 2013/0334917 A1 * | 12/2013 | Miyabara | H02K 11/33 310/71 |
| 2014/0248165 A1 * | 9/2014 | Chang | H02K 15/02 417/354 |
| 2015/0167682 A1 | 6/2015 | Ishihara et al. | |
| 2015/0340923 A1 * | 11/2015 | Lee | F04D 29/325 310/68 B |
| 2018/0166941 A1 | 6/2018 | Shen | |
| 2020/0177056 A1 | 6/2020 | Nakamura et al. | |
| 2021/0399606 A1 | 12/2021 | Schmezer | |

FOREIGN PATENT DOCUMENTS

| | | |
|---|---|---|
| JP | S63-91858 U | 6/1988 |
| JP | 2015-117635 A | 6/2015 |
| WO | 2019/154556 A1 | 8/2019 |

OTHER PUBLICATIONS

Japanese Office Action (JPOA) issued on Aug. 30, 2024 for Japanese Patent Application No. 2021-077857.

* cited by examiner ion No. 2021-077857 filed with the Japan Patent Office on Apr. 30, 2021, the entire content of which is hereby incorporated by reference.

BACKGROUND

1. Technical Field

One aspect of the present disclosure relates to a waterproof fan.

2. Related Art

JP-A-2015-117635 discloses a waterproof fan. A winding of a motor that drives the fan is covered and molded with resin to enhance the water resistance of the winding in the waterproof fan.

SUMMARY

A waterproof fan includes: a rotating blade configured to be rotatable about a rotation axis; a rotor including a permanent magnet; a stator including a plurality of stator cores located on an inner diameter side relative to the rotating blade, the plurality of stator cores extending in a radial direction relative to the rotation axis, and windings each wound around a respective stator core; a circuit board electrically connected to the windings; a waterproof cover including a first resin, the waterproof cover covering the circuit board; and a molded portion including a second resin, the molded portion covering at least the stator. The waterproof cover includes: a partitioning portion separating the windings from the circuit board; and a protruding portion protruding from the partitioning portion into a space between the windings. Gaps between the windings, and the partitioning portion and the protruding portion are filled with the second resin.

DETAILED DESCRIPTION

Figure 1:
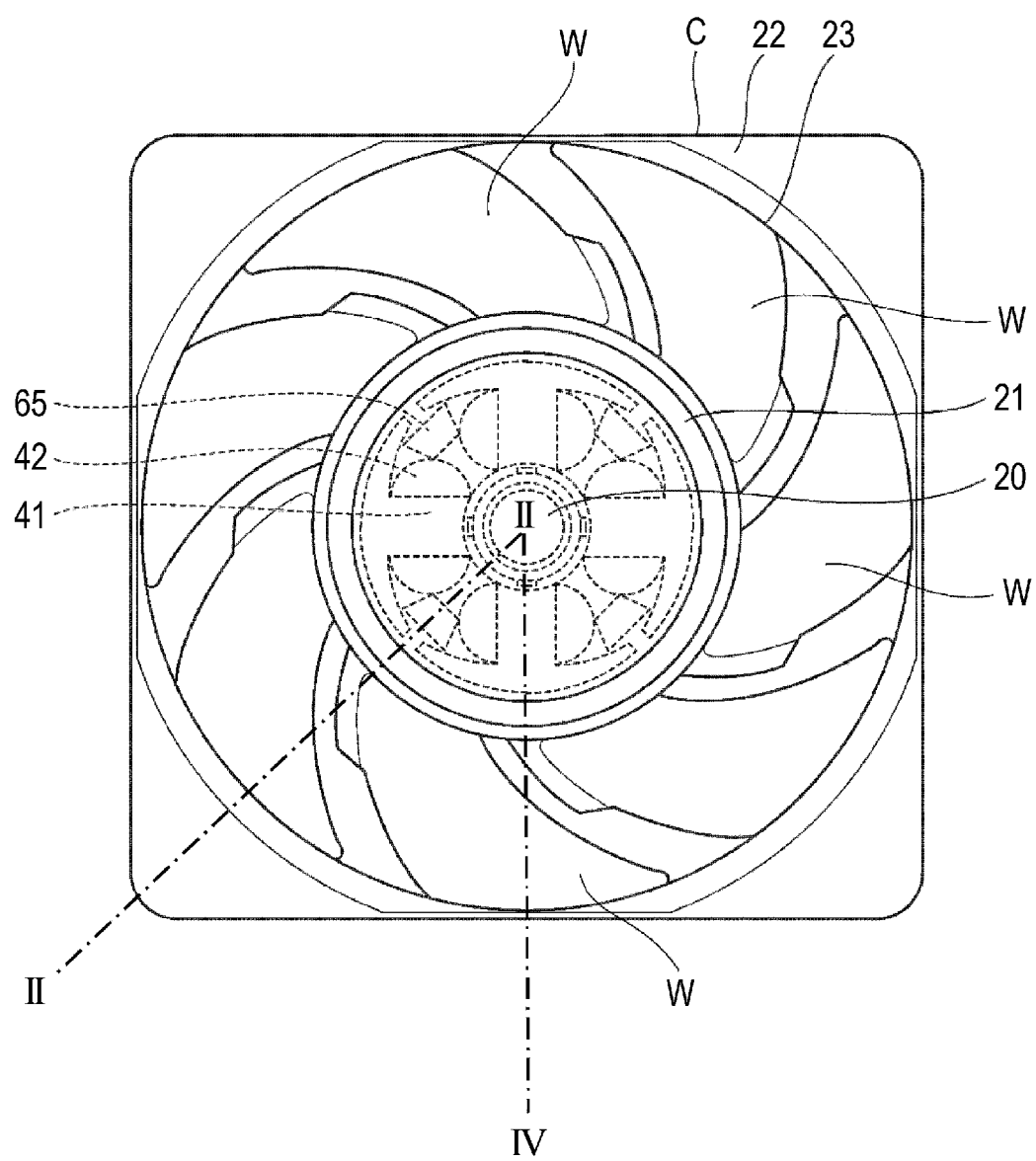
FIG. 1 is a front view of a waterproof fan according to an embodiment of the present disclosure.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In the waterproof fan described in JP-A-2015-117635, a space in the surroundings of a board and a space in the surroundings of the winding are filled with waterproofing resin (epoxy resin) to enhance the water resistance of the board and winding.

However, in such a structure, the amount of epoxy resin to be filled increases. Hence, ways of separating the space where the board is housed and the space where the winding is placed with a waterproof cover, and of enhancing the water resistance of the space where the board is housed by use of the waterproof cover while enhancing the water resistance of the winding by filling epoxy resin only in the surroundings of the winding are being examined.

However, the following has been found in the structure using the waterproof cover: When an ambient temperature becomes high or low, since the coefficient of linear expansion of the metal or resin waterproof cover is different from the coefficient of linear expansion of the epoxy resin, thermal stress may be created between the waterproof cover and the epoxy resin to separate the waterproof cover from the epoxy resin.

One object of the present disclosure is to provide a waterproof fan with high bond strength between a waterproof cover and a waterproofing resin.

A waterproof fan according to one aspect of the present disclosure (the present waterproof fan) includes: a rotating blade configured to be rotatable about a rotation axis; a rotor including a permanent magnet; a stator including a plurality of stator cores located on an inner diameter side relative to the rotating blade, the plurality of stator cores extending in a radial direction relative to the rotation axis, and windings each wound around a respective stator core; a circuit board electrically connected to the windings; a waterproof cover including a first resin, the waterproof cover covering the circuit board; and a molded portion including a second resin, the molded portion covering at least the stator. The waterproof cover includes: a partitioning portion separating the windings from the circuit board; and a protruding portion protruding from the partitioning portion into a space between the windings. Gaps between the windings, and the partitioning portion and the protruding portion are filled with the second resin.

According to the present waterproof fan, it is possible to provide a waterproof fan with high bond strength between a waterproof cover and a resin for water resistance.

An embodiment of the present disclosure is described hereinafter with reference to the drawings. Descriptions of members having the same reference numerals as members that have already been described in the detailed description are omitted for the convenience of description. Moreover, the dimensions of each member illustrated in the drawings may be different from actual dimensions thereof for the convenience of description.

Figure 3:
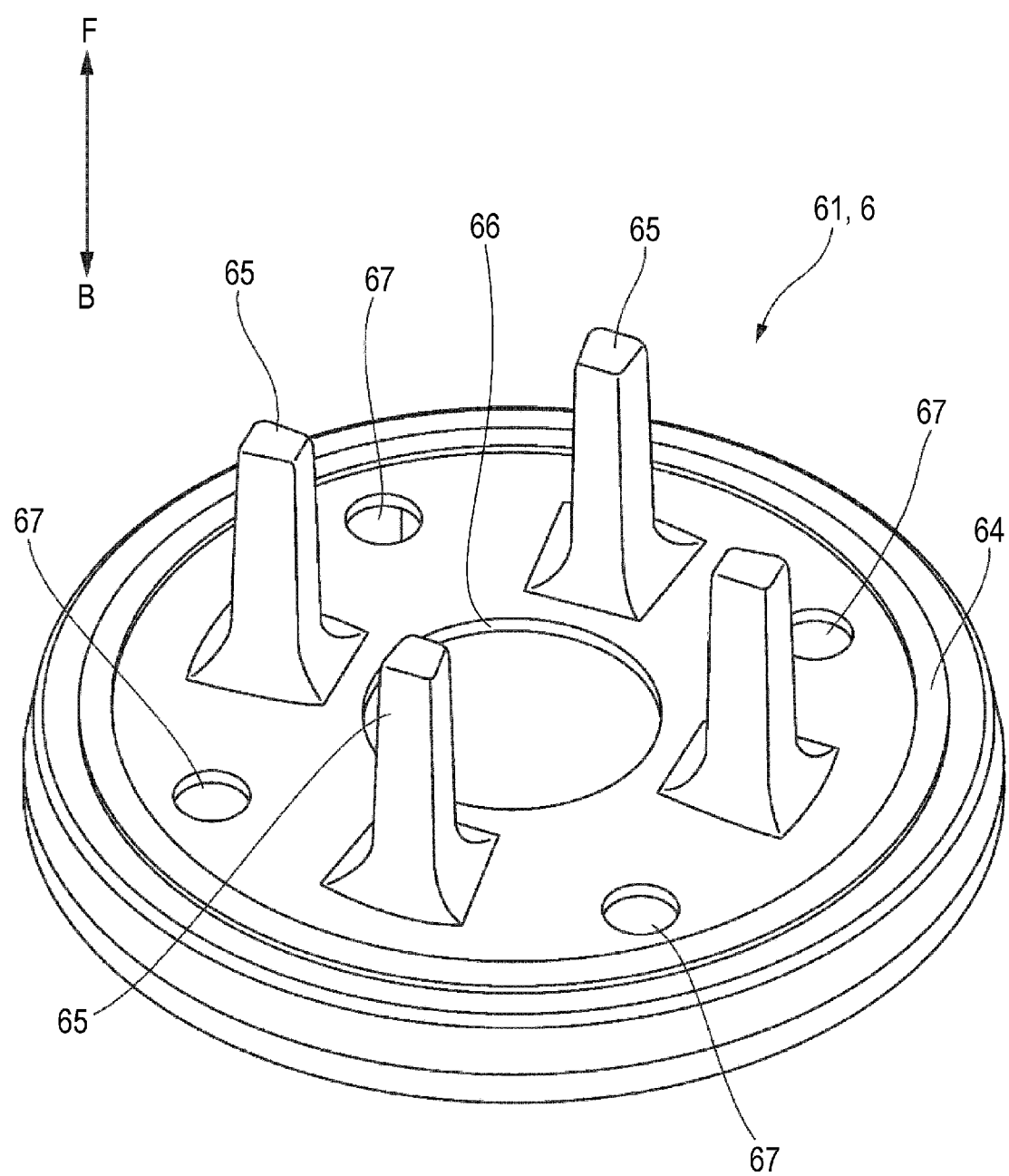
FIG. 3 is a perspective view of a waterproof cover.

FIG. 1 is a front view of a waterproof fan 1 according to the embodiment. FIG. 3 is a front perspective view of a waterproof cover 6 (a first cover 61) provided to the waterproof fan 1. In the following description, a reference sign F indicates the front of the waterproof fan 1, and a reference sign B indicates the back of the waterproof fan 1, in the drawings for the sake of convenience.

As illustrated in FIG. 1, the waterproof fan 1 includes a plurality of (seven in the example) rotating blades W that can rotate about a rotating shaft 20 (that is, about a rotation axis A), and a cylindrical casing C that surrounds the periphery of the rotating blades W in the radial direction. The waterproof fan 1 rotates the rotating blades W to produce a current of air that flows from one side to the other of the rotation axis A of the rotating shaft 20. In the following description, for the sake of convenience, the one side of the rotation axis A may be referred to as the front F while the other side may be referred to as the back B.

The plurality of rotating blades W is radially attached to the perimeter of a hub portion 21. The hub portion 21 is formed in a substantially cup shape, and is provided in such a manner as to surround the rotating shaft 20. The inner structure of a stator 4 of the waterproof fan 1 illustrated in FIG. 1 is drawn by broken lines.

The rotating blades W are attached to the hub portion 21. The rotating blades W rotate and produce a current of air between the rotating blades W and the casing C. The rotating blades W are formed in such a manner as to have a shape and structure that produces a current of air from the one side to the other of the rotation axis A. Moreover, the casing C that surrounds the rotating blades W includes a frame portion 22 formed in the form of a rectangle, and a circular wind-tunnel portion 23 that is defined in the center of the frame portion 22 and guides air flow.

Figure 2:
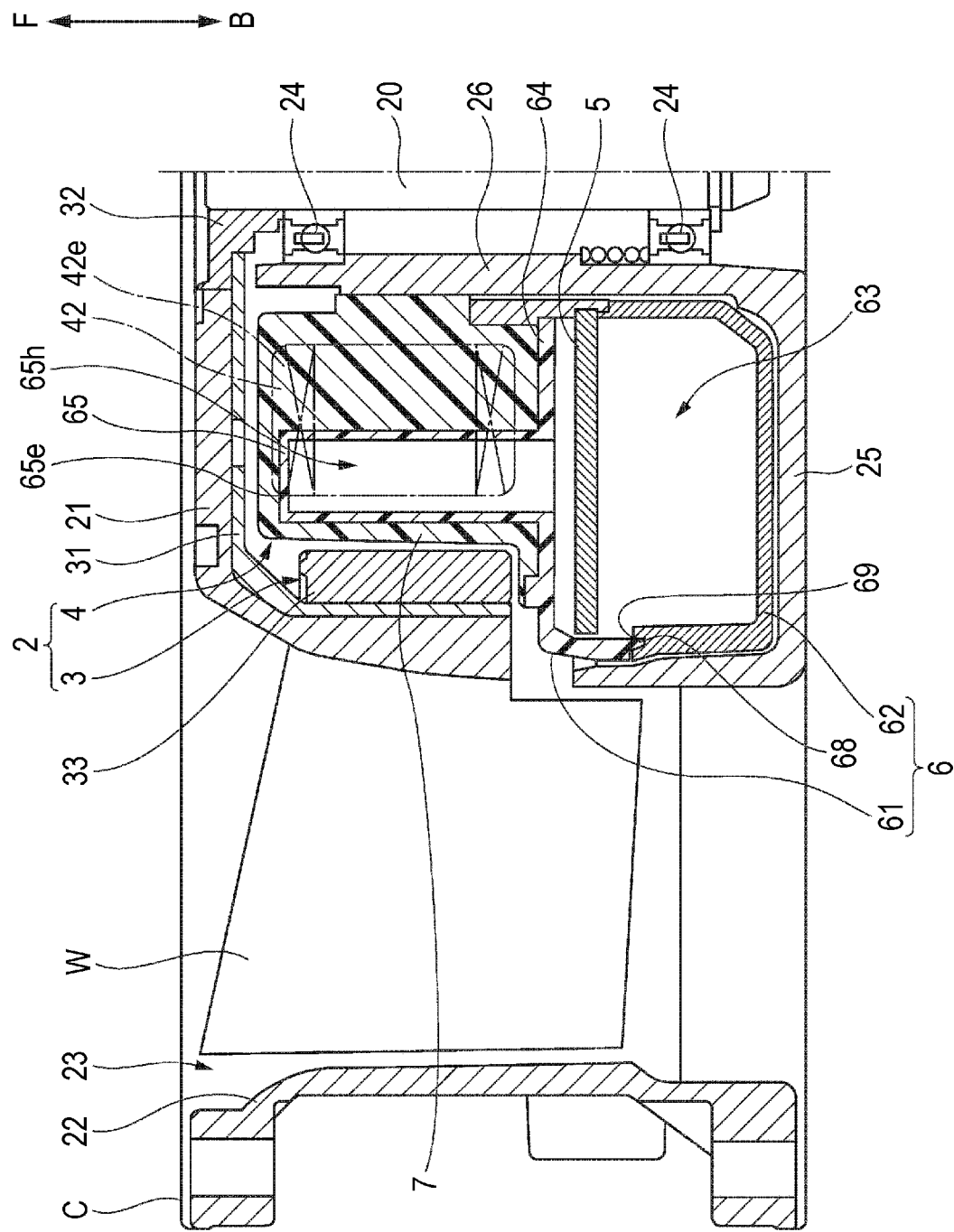
FIG. 2 is a cross-sectional view of the waterproof fan.
Figure 4:
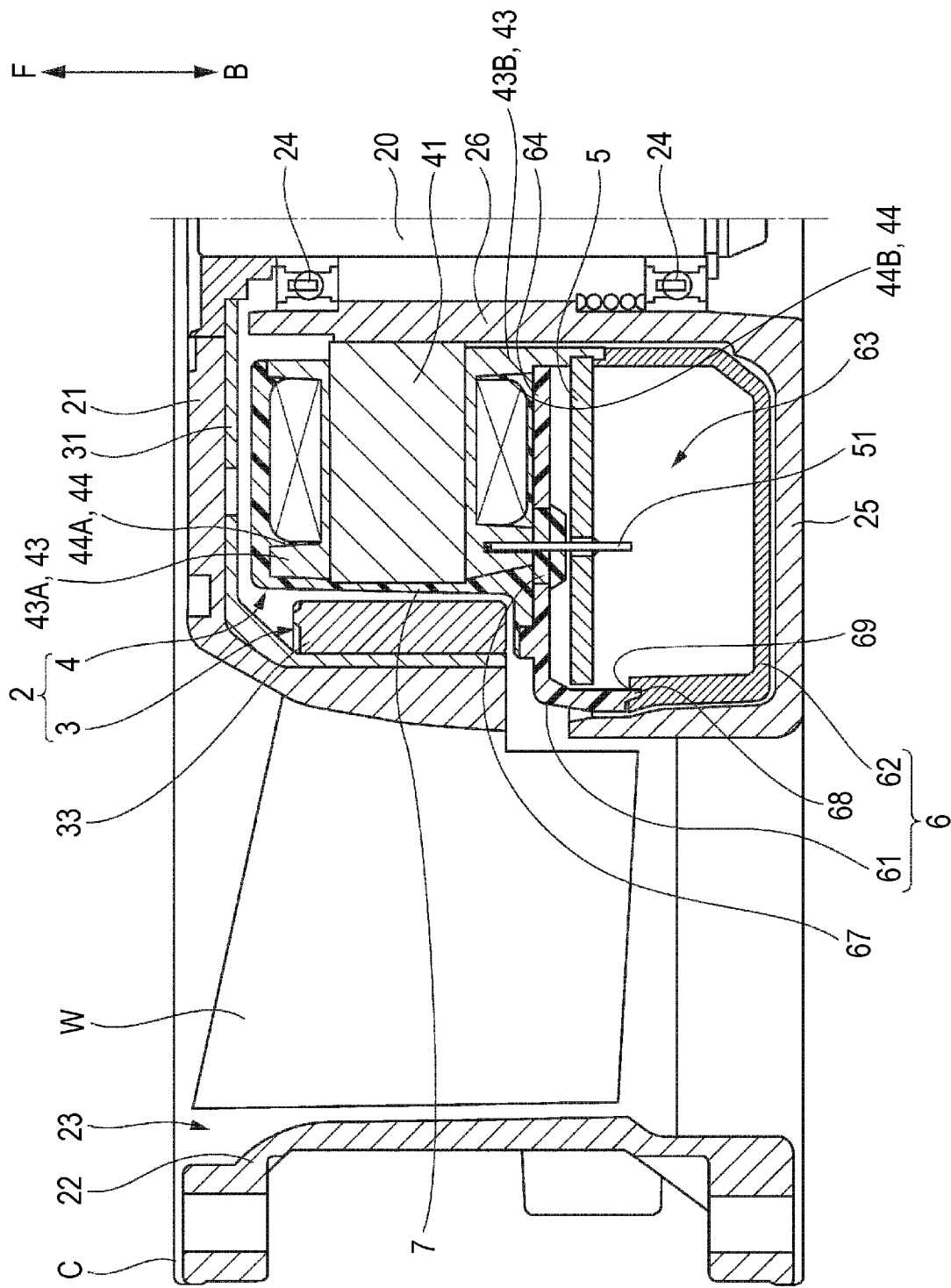
FIG. 4 is a cross-sectional view of the waterproof fan in a section different from FIG. 2.

FIG. 2 is a cross-sectional view of the waterproof fan taken along line II-II in FIG. 1. FIG. 4 is a cross-sectional view of the waterproof fan taken along line II-IV in FIG. 1.

As illustrated in FIGS. 2 and 4, the waterproof fan 1 includes a motor 2 that rotationally drives the rotating blades W. The motor 2 is provided in the hub portion 21 to which the rotating blades W are attached. The motor 2 includes, for example, an outer rotor brushless motor. The motor 2 includes the stator 4, and a rotor 3 that is placed outward of the stator 4.

The rotor 3 includes a substantially cup-shaped rotor cover 31, the rotating shaft 20, and permanent magnets 33 fixed to the rotor cover 31. The rotating shaft 20 is press-fitted by a bush 32 in the central part of the rotor cover 31. The rotor cover 31 is fitted in the hub portion 21. The hub portion 21 where the rotor cover 31 is fitted fixes the rotating shaft 20 via the bush 32.

The rotor cover 31 is mainly made of, for example, a magnetic substance such as a carbon steel casting (SC material). The permanent magnets 33 are fastened to an inner peripheral surface of the rotor cover 31 along the axial direction in such a manner as to be arranged in the peripheral direction. Magnetic lines of force are confined by the rotor cover 31 so that the electromagnetic induction effect increases.

The rotating shaft 20 is supported by a bearing 24 fixed to a stator frame 25 described below, in such a manner as to be rotatable. The bearing 24 is fixed to an inner peripheral surface of a tubular bearing holding portion 26 formed in the central part of the stator frame 25.

The stator 4 includes a plurality of stator cores 41 placed on an inner diameter side relative to the rotating blades W, windings 42 that are each wound around a respective stator core 41, and the stator frame 25.

The stator frame 25 has a substantially cup shape. The stator frame 25 and the hub portion 21 where the rotating blades W are attached are provided along a direction of the rotation axis A in such a manner that inner sides of the cup shapes are in positions facing each other.

Each of the stator cores 41 extends in the radial direction relative to the rotation axis A. The stator core 41 is formed by laminating a plurality of thin metal plates in the thickness direction. Examples of the material of the stator core 41 include a silicon steel plate.

Each of the stator cores 41 is provided outward of the bearing holding portion 26 via an insulator 43. The insulator 43 includes an upper insulator 43A provided to an upper surface of the stator core 41, and a lower insulator 43B provided to a lower surface of the stator core 41. The upper insulator 43A is provided with an upper inner protruding portion and an upper outer protruding portion that extend in the direction of the rotation axis A. An upper slot 44A is formed between the upper inner protruding portion and the upper outer protruding portion. The lower insulator 43B is also provided with a lower inner protruding portion and a lower outer protruding portion that extend in the direction of the rotation axis A. A lower slot 44B is formed between the lower inner protruding portion and the lower outer protruding portion.

The winding 42 is wound around the stator core 41. The winding 42 is housed between the upper slot 44A and the lower slot 44B. The upper insulator 43A is located between the winding 42 and the upper surface of the stator core 41. Moreover, the lower insulator 43B is located between the winding 42 and the lower surface of the stator core 41. Hence, the winding 42 is not electrically continuous with the stator core 41. Moreover, the shape of the upper insulator 43A is larger than the stator core 41, and the shape of the lower insulator 43B is larger than the stator core 41, as viewed in the direction of the rotation axis A. Hence, the winding 42 located between the upper insulator 43A and the lower insulator 43B is not electrically continuous with the stator core 41, either.

The waterproof fan 1 further includes a circuit board 5 supported by the stator frame 25, and the waterproof cover 6 that covers the circuit board 5.

The circuit board 5 is placed behind the stator 4. A wiring pattern for controlling the motor 2 is formed on the circuit board 5. The circuit board 5 is electrically connected to the windings 42 wound around the stator cores 41. A communication terminal 51 that is connected to the wiring pattern is soldered to the circuit board 5. The winding 42 is connected to the communication terminal 51 to electrically connect the circuit board 5 to the winding 42. In other words, the communication terminal 51 electrically connects the circuit board 5 and the winding 42. Although the illustration is omitted, the circuit board 5 is connected to a lead wire for supplying power to the waterproof fan 1.

The waterproof cover 6 is a waterproof cover that is made of a first resin and covers the circuit board 5. The waterproof cover 6 includes the first cover 61 that covers the circuit board 5 from the front side, and a second cover 62 that covers the circuit board 5 from the back side. The circuit board 5 is housed in a housing space 63 formed by the first cover 61 and the second cover 62. The waterproof cover 6 (the first cover 61 and the second cover 62) is mainly made of an electrical insulating synthetic resin (the first resin).

The first cover 61 is a cup-shaped member that opens to the back as illustrated in FIGS. 2 and 3. The first cover 61 includes a partitioning portion 64 that separates the windings 42 wound around the stator cores 41 from the circuit board 5, and a plurality of (four in this example) protruding portions 65 that protrudes frontward from the partitioning portion 64.

The partitioning portion 64 is a plate-shaped part that extends along a plane intersecting the rotation axis A. An insertion hole 66 where, for example, the rotating shaft 20, the bearing 24, and the bearing holding portion 26 are inserted is provided in the central part of the partitioning portion 64. Moreover, a communication hole 67 where the communication terminal 51 soldered to the circuit board 5 is inserted is provided in the periphery of the partitioning portion 64.

The protruding portion 65 is a tubular part that extends along the rotation axis A. The protruding portions 65 are each provided in such a manner as to protrude into a separate space between the windings 42 as viewed in the direction of the rotation axis A and fill the separate space. The protruding portion 65 is formed in such a manner that an inside thereof is a cavity 65h. In the illustrated example, the protruding portion 65 has an isosceles trapezoidal shape in a cross section that traverses the protruding direction.

The first cover 61 is attached in such a manner that the communication terminal 51 of the circuit board 5 is inserted through the communication hole 67 of the partitioning portion 64 and that each of the protruding portions 65 is placed in the separate space between the windings 42 that are each wound around the respective stator core 41.

The second cover 62 has a shape fitting the shape of the stator frame 25 as illustrated in FIGS. 2 and 4. The second cover 62 is provided in the cup-shaped stator frame 25. A depression portion 69 is formed in the edge of the second cover 62. A projection portion 68 formed in the edge of the first cover 61 fits in the depression portion 69 of the second cover 62. As a result, the waterproof cover 6 is formed.

As illustrated in FIG. 2, the waterproof cover 6 is provided in such a manner that an end 65e, which is on a side farther from the circuit board 5 (on the front side), of the protruding portion 65 of the first cover 61 is located closer to the circuit board 5 than (backward of) an end 42e, which is on a side farther from the circuit board 5, of the winding 42 wound around the stator core 41.

Moreover, the waterproof fan 1 includes a molded portion 7 that covers the stator 4, as illustrated in FIGS. 2 and 4. The molded portion 7 is mainly made of an electrical insulating synthetic resin (a second resin). The molded portion 7 is made of, for example, a thermosetting epoxy resin. The molded portion 7 is provided in such a manner as to fill gaps between the windings 42 wound around the stator cores 41, and the partitioning portion 64 and the protruding portions 65 of the first cover 61 of the waterproof cover 6 to be able to cover at least the stator 4. In other words, the gaps between the windings 42, and the partitioning portion 64 and the protruding portions 65 are filled with the second resin forming the molded portion 7. The resin forming the molded portion 7 may be a resin that is different from the resin forming the waterproof cover 6 (the first cover 61 and the second cover 62), or may be the same resin.

The resin (second resin) forming the molded portion 7 is provided in such a manner as to be less capable of ingress into the housing space 63 where the circuit board 5 is housed and to cover the surroundings of the stator 4.

Moreover, the resin (second resin) forming the molded portion 7 is provided in such a manner as to block the communication hole 67 of the first cover 61 by entering the communication hole 67 from the outside of the waterproof cover 6, surrounding the communication terminal 51, and to slightly protrude from the communication hole 67 into the housing space 63 along the communication terminal 51. In other words, the second resin forming the molded portion 7 is in the housing space 63 by entering through the communication hole 67 from the outside of the housing space 63.

As described above, in the waterproof fan 1 according to the embodiment, the waterproof cover 6 includes the partitioning portion 64 that separates the windings 42 wound around the stator cores 41 from the circuit board 5, and the protruding portions 65 that protrude from the partitioning portion 64 into the spaces between the windings 42. The gaps between the windings 42, and the partitioning portion 64 and the protruding portions 65 are filled with the synthetic resin (the molded portion 7) to cover the stator 4 of the waterproof fan 1 with the molded portion.

Consequently, the protruding portions 65 can ensure a large contact area between the waterproof cover 6 and the molded portion 7. Hence, it is possible to increase the bond strength between the waterproof cover 6 and the molded portion 7. Therefore, it is possible to restrain the waterproof cover 6 from being separated from the molded portion 7 even if thermal stress is created between the waterproof cover 6 and the molded portion 7 due to the difference between the coefficient of linear expansion of the waterproof cover 6 and the coefficient of linear expansion of the molded portion 7.

For example, a method according to which the space between the waterproof cover and the windings of the stator section of the waterproof fan is filled with silicon resin is also used as the method for covering the stator section. However, in the case of this method, it takes time to fill the silicon resin since the space between the waterproof cover and the windings is large. Hence, this method is inferior in production efficiency. In contrast, in the waterproof fan 1 according to the embodiment, the protruding portions 65 of the waterproof cover 6 protrude into the spaces between the windings 42 and fill the spaces between the windings 42 in advance. Therefore, the amount of silicon resin to be filled can be dramatically reduced. As a result, production efficiency can be increased.

Moreover, in the waterproof fan 1, the protruding portion 65 is formed in such a manner that the inside thereof is the cavity 65h. Hence, the protruding portion 65 has a structure that is susceptible to deformation. Hence, even if the protruding portion 65 is pressed by the molded portion 7 due to the expansion of the molded portion 7, the protruding portion 65 deforms, which enables restraining an excessive force from acting on the protruding portion 65 and the molded portion 7. Moreover, the presence of the protruding portions 65 reduces the amount of the resin of the molded portion 7 to be filled; therefore, it is possible to reduce a force that is produced when the molded portion 7 expands. Therefore, an excessive force hardly acts on the winding 42.

Moreover, in the waterproof fan 1, the partitioning portion 64 is the plate-shaped part that extends along the plane intersecting the rotation axis A. Moreover, the protruding portion 65 is formed in such a manner as to be the tubular part that extends along the rotation axis A. Hence, when the molded portion 7 expands and contracts in the direction of the rotation axis A, the partitioning portion 64 can easily maintain the joint with the molded portion 7. On the other hand, when the molded portion 7 expands and contracts in a direction orthogonal to the rotation axis A, the protruding portion 65 can easily maintain the joint with the molded portion 7. In other words, the directions in which the partitioning portion 64 and the protruding portion 65 extend are different from each other; therefore, whichever direction the molded portion 7 expands and contracts, the state where the molded portion 7 and the waterproof cover 6 are joined can be easily maintained.

Moreover, in the waterproof fan 1, the waterproof cover 6 includes the first cover 61 having the partitioning portion 64 and the protruding portions 65, and the second cover 62 that, together with the first cover 61, forms the housing space 63 where the circuit board 5 is housed. The waterproof cover 6 is configured in such a manner as to be less susceptible of the ingress of the molded portion 7 into the housing space 63 where the circuit board 5 is housed. Hence, it is possible to reduce the amount of the synthetic resin to be used for forming the molded portion 7. As a result, the weight of the waterproof fan 1 can be reduced.

Moreover, in the waterproof fan 1, the end 65e, which is on the side farther from the circuit board 5, of the protruding portion 65 of the first cover 61 is provided in such a manner as to be located closer to the circuit board 5 than the end 42e, which is on the side farther from the circuit board 5, of the winding 42 wound around the stator core 41 in the direction of the rotation axis A. Hence, the protruding portion 65 placed in the space between the windings 42 is located inward of the winding 42. Therefore, when the molded portion 7 covers the surface of the stator 4, the surface of the stator 4 can be covered in such a manner as to prevent the protruding portion 65 from protruding from the molded portion 7. Consequently, it is possible to restrain a gap from being created between the protruding portion 65 and the molded portion 7. Therefore, a high water resistance can be ensured.

Moreover, in the waterproof fan 1, the first cover 61 is provided with the communication hole 67 where the communication terminal 51 that electrically connects the circuit board 5 and the winding 42 is inserted. The resin (second resin) forming the molded portion 7 is provided in such a manner as to block the communication hole 67 of the first cover 61 by entering the communication hole 67 from the outside of the waterproof cover 6, and to be slightly in the housing space 63. Consequently, it is possible to establish an electrical connection between the circuit board 5 and the winding 42 while enhancing the water resistance of the housing space 63.

Up to this point the embodiment of the present disclosure has been described. In terms of this, it is needless to say that the technical scope of the present disclosure should not be construed in a limited manner by the description of the embodiment. The embodiment is a mere example. Those skilled in the art understand that the embodiment can be modified in various manners within the technical scope of the present disclosure described in the claims. The technical scope of the present disclosure should be determined on the basis of the scope described in the claims and the scope of equivalents thereof.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A waterproof fan comprising:
   a rotating blade configured to be rotatable about a rotation axis;
   a rotor including a permanent magnet;
   a stator including a plurality of stator cores located on an inner diameter side relative to the rotating blade, the plurality of stator cores extending in a radial direction relative to the rotation axis, and windings each wound around a respective stator core;
   a circuit board electrically connected to the windings;
   a waterproof cover including a first resin, the waterproof cover covering the circuit board; and
   a molded portion including a second resin, the molded portion covering at least the stator, wherein
   the waterproof cover includes:
      a partitioning portion separating the windings from the circuit board; and
      a plurality of protruding portions each protruding from the partitioning portion into a respective space between adjacent two windings among the windings, an inside of each of the plurality of protruding portions being a cavity, and
   gaps between the windings, and the partitioning portion and the protruding portion are filled with the second resin.

2. The waterproof fan according to claim 1, wherein
   the partitioning portion is a plate-shaped part extending along a plane intersecting the rotation axis, and
   each of the plurality of protruding portions is a tubular part extending along the rotation axis.

3. The waterproof fan according to claim 1, wherein
   the waterproof cover includes:
      a first cover having the partitioning portion and the protruding portion; and
      a second cover, together with the first cover, forming a housing space housing the circuit board,
   the first and second covers are fixed to the stator, and
   the second resin is not in the housing space.

4. The waterproof fan according to claim 1, wherein in a direction of the rotation axis, an end, which is on a side farther from the circuit board, of the protruding portion is located closer to the circuit board than an end, which is on a side farther from the circuit board, of the windings.

5. The waterproof fan according to claim 3, wherein
   the first cover is provided with a communication hole where a communication terminal that electrically connects the circuit board and the windings are inserted.

6. The waterproof fan according to claim 1, wherein
   the plurality of protruding portions are arranged apart from the rotation axis in the radial direction, and are arranged at intervals in a circumferential direction.

7. The waterproof fan according to claim 1, wherein
   each of the protruding portions has a closed distal end an open proximal end, the open proximal end being closer to the partitioning portion than the closed distal end is.

* * * * *